United States Patent Office 3,816,394
Patented June 11, 1974

3,816,394
PROCESS FOR PREPARING A LACTULOSE POWDER BY UTILIZING PROTEIN
Taro Nagasawa, Mamoru Tomita, Yoshitaka Tamura, and Teruhiko Mizota, Tokyo, Japan, assignors to Morinaga Milk Industry Co., Ltd., Tokyo, Japan
No Drawing. Filed Oct. 29, 1971, Ser. No. 193,977
Claims priority, application Japan, May 31, 1971, 46/37,020
Int. Cl. C13k 9/00
U.S. Cl. 260—209 R
4 Claims

ABSTRACT OF THE DISCLOSURE

A lactulose powder containing above 55% by weight lactulose, can be obtained by mixing an aqueous solution containing above 60% by weight of lactulose in total solid content, and an aqueous solution containing at least 5.0%, based on the weight of said lactulose, of protein, adjusting the pH of the resulting mixture to below 7.0 and drying.

BACKGROUND OF THE INVENTION

Field of the invention

This invention relates to a process for preparing a lactulose powder. More particularly, this invention relates to a process for preparing a lactulose powder containing above 55% by weight of lactulose by mixing an aqueous solution containing above 60% by weight of lactulose in total solid content, with an aqueous solution containing at least 5.0% by weight based on the weight of said lactulose, of protein, adjusting the pH of the resulting mixture to below 7.0 and drying.

Description of the prior art

Lactulose is a type of disaccharide which is a highly nutritious supplement for infants as a bifidus factor. It is also a highly effective medicament for constipation and hepatic encephalopathy. Heretofore, however, lactulose has only been available as a liquidy syrup; and hence its field of use has been substantially limited. The difficulty in preparing lactulose in solid or powdery form has been the fact that although lactulose is highly water-soluble, when aqueous solutions of lactulose are dried, it tends to form high viscosity lumps and tends to cling to the walls of the drying chamber.

Besides the fact that lactulose is often inconvenient to use in liquid form, special containers are required to handle the highly viscous solution.

In recent years, a significant amount of research has been conducted aimed at providing lactulose in a dried, powdery form. For instance, methods of drying aqueous lactulose solutions are reported in U.S. Pat. 3,110,600, which teaches that powdered lactulose can be obtained by spraying lactulose and a lactulose-containing aqueous solution into hot gases at temperatures of 135-170° C. Other carbohydrates may be added to the lactulose solution in maximum concentrations of 45-50% as a drying material. That technique, however, results in a powder containing a maximum of 45-50% by weight lactulose, and it has not been possible to achieve higher concentrations. These concentrations, however, are too low for many applications so that a need still exists for a technique of producing higher concenration content powders.

SUMMARY OF THE INVENTION

Accordingly, it is one object of this invention to provide a process for preparing a lactulose powder containing above 55% by weight and desirably more than 60% by weight in an industrially acceptable manner and at a moderate price.

This and other objects have now herein been attained by the discovery that certain quantities of protein can be used to provide high concentration lactulose powders. According to this invention, lactulose powder containing more than 55% by weight lactulose is prepared by mixing an aqueous solution containing more than 60% by weight lactulose with a protein solution having dissolved therein at least 5.0%, by weight based on the weight of lactulose, of protein. The pH of the mixed solution is adjusted to below 7.0 and the solution is dried.

DETAILED DESCRIPTION OF THE INVENTION (1) Lactulose-containing aqueous solution The lactulose aqueous solution used in the present invention may be manufactured by any conventional process. However, in order to provide the high content powder, the lactulose aqueous solution used should contain at least 57.2% by weight of lactulose in solid content. Preferably, however, the lactulose solution should contain at least 60% by weight lactulose since the final product will ordinarily contain some amounts of moisture, ash and protein.

The pH of the mixed solutions should be adjusted to below 7.0. If the pH is above 7.0, the lactulose will tend to decompose during drying and its content in the powder will be reduced. Moreover, the powder will assume an undesirably brownish color. However, the pH must be above a certain critical point to permit precipitation or coagulation of the protein in the mixed solution.

(2) Protein solution

A wide variety of different proteins may be used to satisfy the requirements of this invention. For instance, suitable protein sources include casein, soy bean protein and whey powder, etc. When casein is used, a casein alkali solution or an aqueous solution of sodium caseinate (pH below 7.0) may be used which contains dissolved lactic acid casein or hydrochloric acid casein. The pH can be lowered by use of an edible alkaline agent.

The protein solution such as a solution of the soy bean protein powder, the skim milk powder or the whey powder, in water, is mixed with the lactulose-containing aqueous solution. It is important that the protein content in the above protein solution be at least 5% by weight based on the amount of lactulose in the lactulose-containing aqueous solution to be mixed therewith. To show the effect of the addition of protein, the following experiments were carried out:

A lactulose-containing aqueous solution containing 65% by weight total solid content, 50% by weight lactulose, 7.0% by weight galactose, 7.8% by weight lactose, and 0.2% by weight others, and an alkali casein solution containing 10% by weight protein concentration and a pH of 6.4 and containing dissolved lactic acid casein and tripotassium phosphate in the ratio of 11.9 kg. of the former to 0.715 kg. of the latter, were prepared. The above solutions were mixed so that the ratio of protein to lactulose was 2, 3, 5, 10 and 20%. The mixed solutions were dried by means of a conventional spray dryer. The drying temperatures were 220 to 230° C. at hot air inlet and 90 to 94° C. at outlet.

With those solutions which contained the protein in a ratio of 2 or 3% by weight based on the lactulose, sprayed droplets were found to form droplets which accumulated onto the inner walls of the dryer in a slightly viscous state, which was difficult to remove. The dried material which was removed from the dryer by mechanical means was quite lumpy and not at all free flowing. When the drying solution contained 5% by weight protein, the amount of accumulation on the inner walls of the dryer was considerably less. Moreover, the adhered material could be easily removed so that this technique can be used industrially. If the drying solution contained above 10% by weight protein, there was so little accumulation on the interior walls of the dryer that the drying condition was similar to that experienced in drying common skim milk, so that this technique is quite advantageous for industrial application.

However, in order to incorporate above 55% of lactulose in the final product powder, the amount of protein used, of course, is self-limiting. The minimum amount of protein to be added was found to be at least 5% by weight based on the weight of the lactulose.

Analysis of the freely flowable lactulose powder obtained by incorporating 5% by weight of protein in the above experimental embodiment was as follows:

| | Percent |
|---|---|
| Lactulose | 72.30 |
| Galactose | 10.30 |
| Lactose | 11.50 |
| Protein | 3.64 |
| Ash | 0.35 |
| Water | 1.80 |
| Others | 0.11 |

This analysis was almost the same as the theoretical value. Moreover, no decomposition of the sugar component during the drying operation was detected. It is of interest to note here that the sugar analysis was measured by gas chromatography by the method of Sweely et al. (J. Am. Chem. Soc., 85, 2497 (1963)). Ash was measured by incineration. Protein was measured by the Kehldahl method and water was measured by thermal drying.

As shown above, when casein protein, e.g., a milk protein, was used, good results were obtained and a freely flowable powder was obtained with the use of amounts in excess of 5%. In similar experiments using soy bean protein powder, whey powder, skim milk powder, etc., it was found that, when the quantity of protein was above 5% by weight, the quantity of lactulose adhered to the walls of the dryer was considerably decreased and removal of the powder was sufficiently easy that a freely flowable dried powder was obtained.

The purity of the lactulose in the final product varied somewhat depending upon the particular protein used, since the different protein sources contained different impurities in varying amounts. For instance, when 5% protein was added to the lactulose, the purity of the lactulose powder was as follows, depending upon the particular protein:

when using commercially available soy bean powder (protein content 59%), lactulose purity about 69%;
when using whey powder (protein content 12.5%), lactulose purity about 58%;
when using skim milk powder (protein content 34%), lactulose purity about 68%.

Therefore, casein is most desirably used for obtaining a higher purity lactulose powder. However, soy bean protein or other protein can also be used, although the lactulose content may be somewhat lower as compared with the results obtained when using casein.

For comparison, various carbohydrates were added, including lactose, malt, dextrine, rice powder, etc. alone and in various combinations, to the above lactulose-containing aqueous solution, so that the final product was above 55% in lactulose content. These solutions were spray dried under the same drying conditions, by means of the same dryer, as above. In each instance, highly viscous spraying droplets were found to adhere and accumulate onto the inner walls of the dryer which could only be removed with great difficulty. The dried products obtained were found to be large lumps, which were not freely flowable and were impossible to dry. When ash was added, for example, salt (NaCl), in the amount of 5% by weight based on the weight of lactulose, almost the same results as for the carbohydrates was obtained. In order to obtain a high purity lactulose powder, only the use of protein enabled the formation of the high purity lactulose powder.

The mixed lactulose and protein solution of the present invention, can be easily dried by conventional drying conditions similar to those methods used for drying whole milk powder or skim milk powder. For instance, drying can be accomplished by spraying or centrifugal spraying, or, if necessary, by use of a drum dryer. It is also possible to accomplish drying by lyophilization. In the present invention, when drying is carried out to the extent of below 4.0% by weight in water content, as in conventional whole milk powder or skim milk powder processes, any powder adhering to the inner walls of the dryer will have almost the same quality and condition as whole milk powder or skim milk powder, so that drying can be carried out quite favorably. The product obtained has an excellent degree of free flowability, is high in solubility, is characterized by a favorable flavor and is higher than 55% by weight in lactulose content. The possible range of applications for this product is therefore considerably broader than the prior are powders.

For instance, the lactulose powder of the present invention can be mixed with other powders or solid type foodstuffs, in any ratio, or can easily be prepared in tablet form. In addition, the powder of the present invention can be easily preserved and transported because of its powder form. Moreover, by starting with a pure lactulose syrup, it is possible to obtain a powder of about 93% by weight in lactulose content.

Having generally described the invention, a further understanding can be obtained by reference to certain specific examples, which are provided herein for purposes of illustration only and are not intended to be limiting unless otherwise specified.

EXAMPLE 1

A casein solution of 10% in protein concentration and 6.4 in pH was prepared by adding 298 g. of commercially available acid casein (composition: protein 84%, fat 1.5%, ash 2.5% and water 12%) to 17.9 g. of tri-potassium phosphate in 2180 g. of water. The mixture was heated to 75° C. and added to 10 kg. of lactulose syrup consisting of 50% lactulose, 7.0% galactose, 7.8% lactose, 0.2% of others and 35% water. It was then mixed and the pH was adjusted to 6.5. The liquid obtained was dried by means of a centrifugal type spray dryer (manufactured by Anhydro Co.) wherein the hot air inlet temperature was about 240° C. and the outlet temperature was about 100° C. 6.9 kg. of lactulose powder containing about 72% of lactulose was obtained.

EXAMPLE 2

A solution of 7.08% in protein concentration was prepared by dissolving 600 g. of soy bean protein Prorich (manufactured by Aji-no-moto Co.; composition: protein 59%, fat 0.2%, sugar 25%, ash 8.5%, others 2.3% and water 5%) in 4.4 kg. of water. This mixture was added to 10 kg. of lactulose syrup consisting of 50% lactulose, 7.0% of galactose, 7.8% of lactose, 0.2% of others and 35% water. It was then mixed and the pH was adjusted to 6.6. The liquid obtained was dried by means of a centrifugal type of spray dryer (manufactured by Anhydro Co.) wherein the hot air inlet temperature was about 180° C. and the outlet temperature was about 90° C. About 7.2 kg. of lactulose powder, containing about 69.5% of lactulose was obtained.

EXAMPLE 3

A solution of 11.3% in protein concentration was prepared by dissolving 1 kg. of commercially available skim milk powder (composition: protein 34%, lactose 54%, fat 1%, ash 8%, and water 3%) in 2 kg. of warm water. The mixture was added to 10 kg. of lactulose syrup consisting of 50% lactulose, 7.0% galactose, 7.8% lactose, 0.2% of others and 35% water. The liquid obtained was dried by means of a centrifugal type spray dryer (manufactured by Anhydro Co.) wherein the hot air inlet temperature was about 105° C. About 7.6 kg. of lactulose powder containing about 65.5% of lactulose, was obtained.

EXAMPLE 4

A solution of 2.5% in protein concentration was prepared by dissolving 2 kg. of commercially available whey powder (composition: protein 12.5%, lactose 73.5%, fat 1%, ash 9%, and water 4%) in 8 kg. of warm water. The mixture was added to 10 kg. of lactulose syrup consisting of 50% lactulose, 7.0% galactose, 7.8% lactose, 0.2% of others and 35% of water, mixed and adjusted the pH to 6.7. The liquid obtained was dried by means of a centrifugal type spray dryer (manufactured by Anhydro Co.) wherein the hot air inlet temperature was about 200° C. and the outlet temperature was about 88° C. About 8.7 kg. of lactulose powder containing about 57.5% of lactulose, was obtained.

Having now fully described the invention, it will be understand that many changes and modifications will readily be apparent to one of ordinary skill in the art. Accordingly, what is claimed as new and intended to be secured by Letters Patent of the United States is:

1. A process for preparing a lactulose powder containing above 60% by weight of lactulose which comprises mixing an aqueous solution containing above 60% by weight of lactulose in solid content, with a protein solution containing at least 5% by weight based on the weight of the lactulose, of a protein selected from the group consisting of casein, whey powder and soy bean protein, adjusting the pH of the mixed solution to below 7.0 and drying said solution.

2. The process of claim 1 wherein said protein is casein protein.

3. The process of claim 1 wherein said powder is whey protein.

4. The process of claim 1 wherein said protein is soy bean protein.

References Cited

UNITED STATES PATENTS 3,110,600  11/1963  Bok _____ 260—209 R
3,546,206  12/1970  Guth et al. _____ 260—209 R JOHNNIE R. BROWN, Primary Examiner U.S. Cl. X.R.

424—177, 180